(12) United States Patent
Bard et al.

(10) Patent No.: US 11,926,122 B2
(45) Date of Patent: Mar. 12, 2024

(54) LUMINESCENT GLAZING

(71) Applicant: ACR II GLASS AMERICA INC., Nashville, TN (US)

(72) Inventors: Michael Bard, Wadern (DE); Emily Anne Curtis, Nashville, TN (US)

(73) Assignee: ACR II GLASS AMERICA INC., Nashville, TN (US)

( * ) Notice: Subject to any disclaimer, the term of this patent is extended or adjusted under 35 U.S.C. 154(b) by 344 days.

(21) Appl. No.: 17/599,911

(22) PCT Filed: Apr. 2, 2020

(86) PCT No.: PCT/US2020/026295
§ 371 (c)(1),
(2) Date: Sep. 29, 2021

(87) PCT Pub. No.: WO2020/206057
PCT Pub. Date: Oct. 8, 2020

(65) Prior Publication Data
US 2022/0194058 A1    Jun. 23, 2022

Related U.S. Application Data

(60) Provisional application No. 62/828,649, filed on Apr. 3, 2019.

(51) Int. Cl.
*B32B 15/04*    (2006.01)
*B32B 17/06*    (2006.01)
(Continued)

(52) U.S. Cl.
CPC .. *B32B 17/10678* (2013.01); *B32B 17/10036* (2013.01); *C03C 17/007* (2013.01);
(Continued)

(58) Field of Classification Search
CPC ................... B32B 17/10036; B32B 2307/422
(Continued)

(56) References Cited

U.S. PATENT DOCUMENTS 8,216,670 B2 *  7/2012  Kumon ................... C03C 1/008
                                                    428/428
8,932,397 B2 *  1/2015  Ishibai ..................... C09D 5/32
                                                    106/287.11
(Continued)

FOREIGN PATENT DOCUMENTS

JP    H07-13098 A    1/1995
JP    6273980 B2     2/2018
(Continued)

OTHER PUBLICATIONS

Extended Search Report for related European Application No. 20782389.9; action dated May 10, 2022; (6 pages).
(Continued)

*Primary Examiner* — Lauren R Colgan
(74) *Attorney, Agent, or Firm* — K&L Gates LLP

(57) ABSTRACT

A glazing applicable to multiple illumination products comprises a first glass substrate having first and second surfaces, a second glass substrate having third and fourth surfaces, a polymer interlayer laminated between the first and second substrates, and a coating including a first luminescent material and being applied on one of the third and fourth surfaces of the second glass substrate, for emitting light to both of the interior and exterior.

20 Claims, 16 Drawing Sheets

(51) Int. Cl.
B32B 17/10 (2006.01)
C03C 17/00 (2006.01)
(52) U.S. Cl.
CPC ..... *B32B 2255/00* (2013.01); *B32B 2307/422* (2013.01); *B32B 2605/006* (2013.01); *C03C 2217/74* (2013.01)
(58) Field of Classification Search
USPC .......................................... 428/426, 428, 432
See application file for complete search history.

(56) References Cited

U.S. PATENT DOCUMENTS

| | | | | |
|---|---|---|---|---|
| 10,179,442 | B2* | 1/2019 | Keller | B32B 17/10761 |
| 11,801,667 | B2* | 10/2023 | Oota | B32B 17/10541 |
| 2004/0070551 | A1* | 4/2004 | Walck | B32B 17/10834 345/7 |
| 2006/0066508 | A1* | 3/2006 | Walck | B32B 17/10761 359/630 |
| 2008/0206533 | A1 | 8/2008 | Yaoita et al. | |
| 2010/0253600 | A1* | 10/2010 | Seder | G01S 13/723 345/7 |
| 2011/0073773 | A1* | 3/2011 | Labrot | G02B 27/01 428/29 |
| 2013/0202883 | A1 | 8/2013 | Dekoninck et al. | |
| 2014/0232707 | A1 | 8/2014 | Alschinger et al. | |
| 2015/0323716 | A1* | 11/2015 | Greb | G02B 5/201 156/99 |
| 2016/0046522 | A1 | 2/2016 | Kodaira et al. | |
| 2016/0075111 | A1* | 3/2016 | Dixon | B32B 37/12 428/192 |
| 2016/0266382 | A1 | 9/2016 | Clabau et al. | |
| 2017/0001417 | A1* | 1/2017 | Oota | B32B 17/10688 |
| 2018/0240344 | A1 | 8/2018 | Matthiesen et al. | |
| 2022/0152992 | A1* | 5/2022 | Oota | G02B 5/223 |

FOREIGN PATENT DOCUMENTS

| | | |
|---|---|---|
| WO | 2018141742 A1 | 8/2018 |
| WO | 2018211979 A1 | 11/2018 |

OTHER PUBLICATIONS

International Search Report and Written Opinion of the International Searching Authority for International Application No. PCT/US2020/026295, dated Jun. 12, 2020, by International Searching Authority/US, 15 pages.

TruLife Optics. "TL2 Technology Developer User Guide". Aug. 3, 2016. <http://trulifeoptics.com/assets/Tech_sheet_for_developers.pdf> Retrieved Sep. 27, 2021.

UVR Media, LLC. Grayson, Chris. "Holographic Waveguides: What You Need to Know to Understand the Smartglasses Market". May 4, 2017. <https://uploadvr.com/waveguides-smartglasses> Retrieved Sep. 27, 2021.

Luminit, LLC. "Thin Film Optics for Augmented Reality". <https://www.luminitco.com/products/holographic-optical-elements> Retrieved Sep. 27, 2021.

* cited by examiner

LUMINESCENT GLAZING

CROSS REFERENCE TO RELATED APPLICATIONS

This application is a national stage of PCT International Application No. PCT/US2020/026295, filed Apr. 2, 2020, and claims priority to U.S. provisional patent application Ser. No. 62/828,649, filed Apr. 3, 2019, entitled "LUMINESCENT GLAZINGS." the entire contents of which are incorporated herein by reference in their entirety.

TECHNICAL FIELD

The present disclosure generally relates to a vehicle glazing having a luminescent coating, wherein an image may be projected onto the luminescent coated glazing.

BACKGROUND

Head-up display (HUD) systems are used in vehicle to provide an image that a driver may see without averting their eyes from the windshield in front of them. HUD systems may typically include a projector which may project an image to be reflected off of a windshield, such that the driver may see a virtual image(s). A windshield, however, has two reflective glass surfaces which may each reflect an image from a projector. The multiple reflections may have varying intensities where a weaker image reflection may appear as a "ghost" image, which may be hazy and less clear than the other image.

Wedge-shaped polymer interlayers have been used to address this problem by aligning the two images such that there is a single image observed by a driver. However, the wedge shape is not adjustable, and the images are aligned only for drivers of a particular height. There is a need in the art for a widely applicable solution for HUD displays. Particularly, there is a need for drivers of any height to see an image and for the ability to use multiple projectors to create a more complex display.

SUMMARY OF THE DISCLOSURE

Disclosed herein is an embodiment which may include a glazing, comprising a first glass substrate having first and second surfaces, a second glass substrate having third and fourth surfaces, a polymer interlayer laminated between the first and second substrates, and a coating including a first luminescent material and being applied on one of the third and fourth surfaces of the second glass substrate.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Disclosed herein are exemplary aspects of a glazing having a luminescent coating. In the following description, for purposes of explanation, specific details are set forth in order to promote a thorough understanding of one or more aspects of the disclosure. It may be evident in some or all instances, however, that many aspects described below can be practiced without adopting the specific design details described below.

Figure 1:
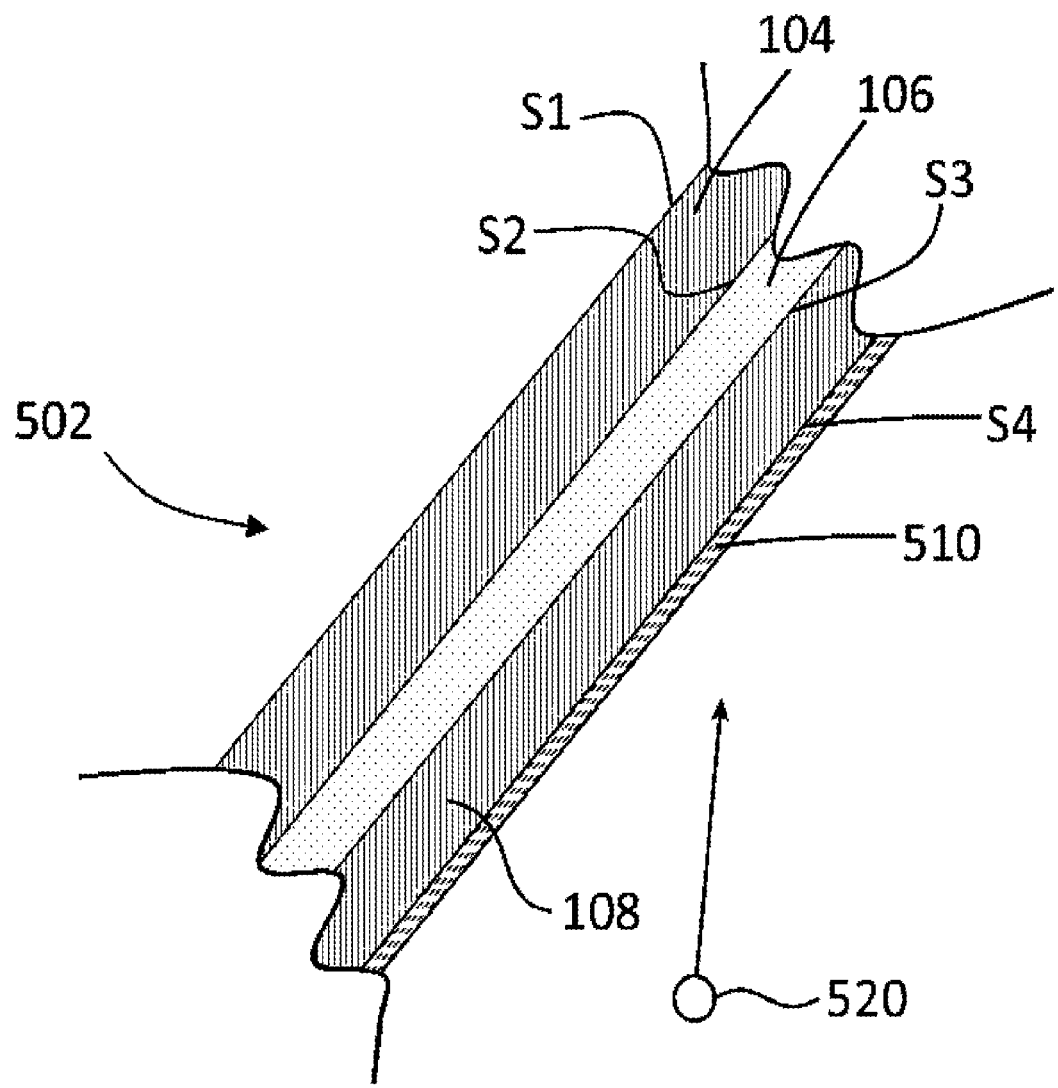
FIG. 1 illustrates a glazing having a luminescent coating, according to an exemplary aspect of the present disclosure.

Embodiments disclosed herein may be used for automotive glazings, including, without limitation, windshields, rear windows, side windows, sunroofs, and any other appropriate glass surface. As shown in FIG. 1 and the following drawings, the term "S1" refers to a first surface of a first glass substrate 104, or namely, the exterior glass surface in an automotive application. The term "S4" refers to a fourth surface of a second glass substrate 108, or namely, the interior glass substrate surface of a laminated automotive glass product. The term "S2" designates a second surface of the first glass substrate 104 opposite the surface S1, and the term "S3" designates a third surface of the second glass substrate 108 opposite the surface S4. In a laminated glass product, S2 and S3 may be a part of the laminate interior, facing one another. S2 may be an interior glass substrate surface in an automotive construction having a single glass substrate, including a tempered glass substrate.

According to some aspects of the present disclosure, a coating may have luminescent capabilities. It may be preferable, in some embodiments, that a luminescent capability is provided by a fluorescent or phosphorescent material, which may include particles and/or dyes.

Referring to FIG. 1, a laminated glazing 502 for a vehicle windshield in this disclosure may include both a first glass substrate 104 and a second glass substrate 108. The first glass substrate 104 may face a vehicle exterior and include surfaces S1 and S2. The second glass substrate 108 may face a vehicle interior and include surfaces S3 and S4. The first and second glass substrates 104 and 108 may be initially flat and heat treated (e.g., thermally tempered, heat bent, and/or heat strengthened), typically at temperatures of at least 500° C., and more preferably at least about 580° C. During heat treatment, in some embodiments, the glass substrates 104 and 108 may be bent to a desired curved shape for a particular glazing application. Glass bending may preferably occur at temperatures from 560° C. to 700° C., more preferably from 580° C. to 660° C.

A polymer interlayer 106, which may include polyvinyl butyral (PVB), any other suitable polymer-based laminating material, including ethylene vinyl acetate (EVA), or an ionomer material, may be provided to laminate glass substrates 104 and 108 together. Lamination may include autoclaving, where the glass substrates 104 and 108, having the polymer interlayer 106 therebetween, may be heated to at least one laminating temperature under at least one laminating pressure (for example, without limitation, 110° C. to 160° C. and 10 to 15 bar) to laminate the glass substrates 104, 108 and form the vehicle windshield 102 or another laminated window product such as a sunroof, side window, quarter window or rear window.

Light sources, such as a light emitting devices, light projectors, and display devices, including head-up displays (HUDs), may be used with some glazings in a vehicle, such as windshields, rear windows, glass sunroofs, quarter windows and side windows. In FIG. 1, a light source 520 is illustrated as arranged below the laminated glazing 502. In a HUD system, a transparent display may be used for showing data without requiring a vehicle driver to look away from a usual field of view. The transparent display may include an actual image displayed on a glazing. The light source may be a simple LED device or multiple LED devices to indicate signals, signs, messages, images, or any other perceivable objects for either or both of the interior and exterior of the glazing. The light source may be mounted inside a dashboard as to emit the light ray in a vertical fashion. The light source further may be placed inside a trim component as to shield the source device from viewer's eyes. A trim component, or an interior trim, may be provided in a vehicle to cover some parts and wirings in a passenger compartment and may be generally attached to a cabin surface with a fastener such as screw. The light source may be arranged behind a black print area when viewing from the vehicle outside. In embodiments described herein, a coating may be used to display a light projection. A light source and a coating may be any distance from each other. In some embodiments, a lightweight LED device may be attached directly to the surface of the coating or a short distance away from the surface of the coating. The light source may particularly be attached directly to the coating surface or a short distance from the coating surface where a display is directed toward a vehicle exterior.

Among other features, in accordance with aspects of the present disclosure, a coating 510, being luminescent upon excitement of the coating may be provided to produce an image at a coated glazing. In particular embodiments, the coating may be excited by a projected light to provide an image for an observer inside or outside of a vehicle.

Some glazings may include functional interlayers or coatings, such as an infrared reflecting (IRR) coating or low-emissivity (low-E) coating. IRR coatings may include metallic layers, which may be silver. Some functional coatings may be provided on glass surface S2 or S3, where, in a laminated glazing, the coating may be protected from elements where it is laminated between glass substrates. As shown in FIG. 1, certain functional coatings 510 may be provided on the glass surface S4 of the second glass substrate 108 of the laminated glazing 102. Some functional coatings have a suitable durability to be provided on glass surface S1 or S4. A coating may preferably be silicon dioxide based and may include functional elements, including ultraviolet light (UV) absorbing, infrared absorbing (IRA) and/or IRR materials. For example, the silicon dioxide-based material in the coatings may be sintered from a silica binder containing tetra-alkoxysilane, tri-alkoxysilane or a combination thereof. Such coatings are described in Japanese Patent No. 6273980 and U.S. Pat. No. 8,216,670, which are incorporated herein by reference.

In some embodiments, the coating 510 may include a luminescent, such as fluorescent or phosphorescent, material. The luminescent material may be any suitable form, including particles or dyes, organic or inorganic, which may be part of the coating 510. The luminescent material may, in some embodiments, be soluble in plastics, inks, or other coating bases. For example, luminescent particles or dyes may be dissolved in a coating base to provide a luminescent coating. In some embodiments, the luminescent material may be equally distributed in a coating base. The amount of luminescent material in the luminescent coating 510 may affect the intensity of light from excitation of the coating 510. A greater concentration of luminescent materials may provide a more intense luminescent response to light excitation. The luminescent material may be any suitable material, including nitrides such as $(SrCa)AlSiN_3$: $Eu^{2+}$, oxides such as $Y_3Al_5O_{12}$: $Ce^{3+}$ and $Lu_3Al_5O_{12}$: $Ce^{3+}$, II-VI semiconductor compounds such as zinc sulfide, cadmium sulfide, zinc selenide, cadmium selenide, zinc telluride and cadmium telluride, and organic compounds such as dialkyl-dihydroxy-terephthalate. Where luminescent materials are provided as particles, the particles may preferably be less than 20 μm in diameter, more preferably less than 12 μm, and even more preferably less than 6 μm. The luminescent material may be excitable, such that when treated by a particular light wavelength, for example, the luminescent material is illuminated. The luminescent material may preferably be excitable by light wavelength in a range of 250-475 nm. It may be preferable that the luminescent material illuminates when treated with a wavelength less than or equal to 380 nm, more preferably less than or equal to 350 nm, and even more preferably less than or equal to 300 nm. In some embodiments, the luminescent material may be broadband excitable such that the material may illuminate for a range of light wavelengths. Preferably, the luminescent coating 510 is transparent, such that without an exciting source, there is light transmission of preferably at least 70%, more preferably at least 75%.

In further embodiments, there may be more than one luminescent material in a coating or multiple luminescent coatings. For example, the coating 510 may include more than one type of fluorescent material such that each fluorescent material may be reactive to a same or different light wavelength. Multiple luminescent materials may be intermixed or provided in a particular pattern within the coating 510. Where multiple luminescent materials exhibit different excitation colors, the colors may combine to provide a different color to an observer's eye when excited. In certain embodiments, additional luminescent materials may be provided in an additional coating, such that the glazing may have two or more luminescent coatings which may react to the same or different light wavelengths. Where there is more than one luminescent coating, the coatings may be on the same or different glass surfaces and may or may not overlap with one another. A first luminescent coating and a second luminescent coating may be arranged to overlap or arranged so as to not overlap with each other.

Figure 4:
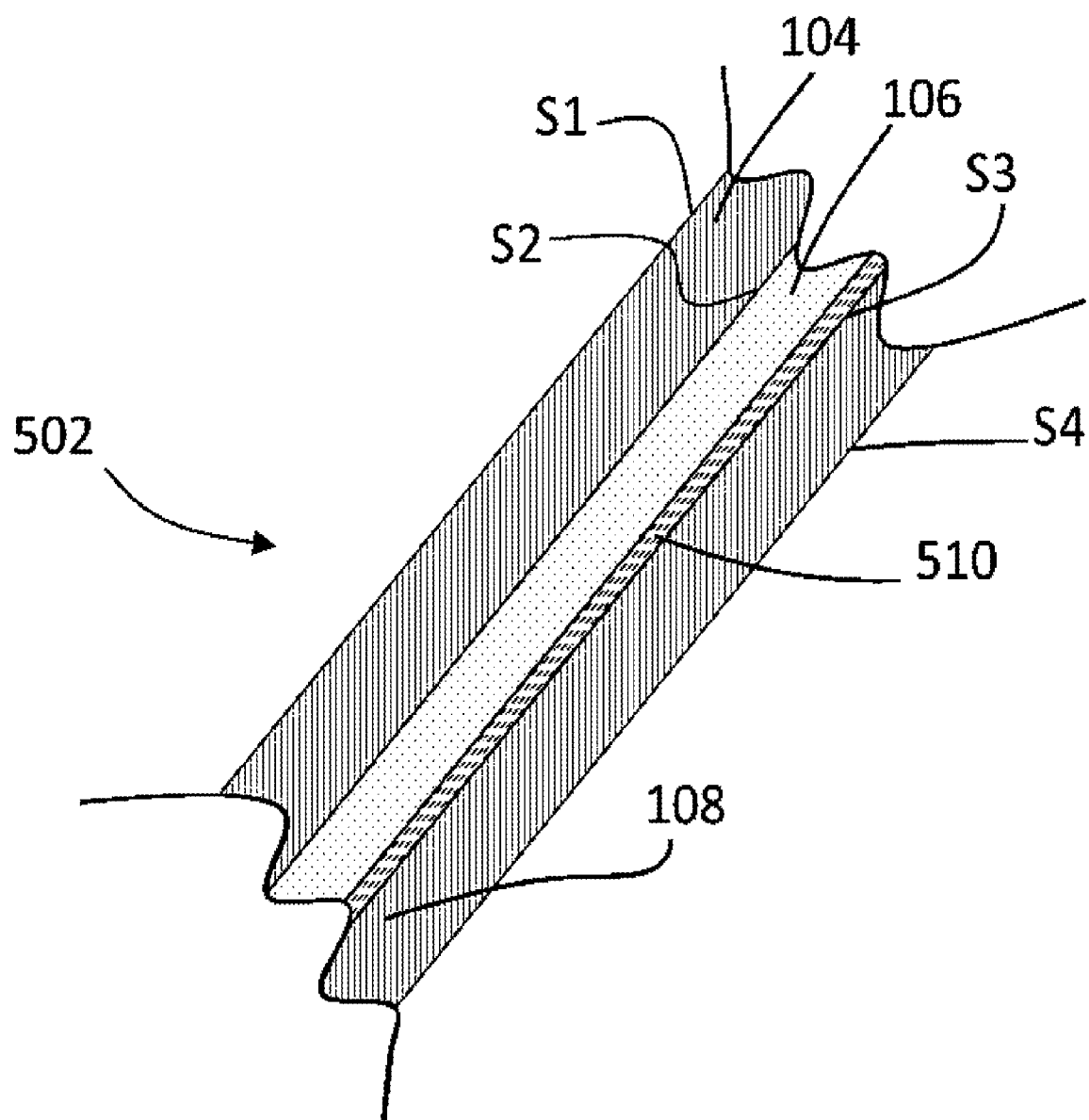
FIG. 4 illustrates a glazing having a luminescent coating, according to yet another exemplary aspect of the present disclosure.

A coating base may be any suitable material. In some embodiments, it may be preferable that a coating base is applicable to an outer glass surface, as shown in FIG. 1. In further embodiments, the coating 510 may be laminated within a glazing, such as on S3, and exposure to elements is limited by the glazing substrates, as shown in FIG. 4. In particular embodiments, the coating base may be a silicon dioxide-based material, which may optionally be sintered from a silica binder containing tetra-alkoxysilane, tri-alkoxysilane or combinations thereof. In some embodiments, the coating may further include a polymer resin, such as epoxy, silicone, vinyl ester, polyvinyl butyral, polyvinyl alcohol, urethane and/or combinations thereof. It may be preferable that a coating base provide moisture protection for luminescent materials dissolved therein to maintain suitable quantum efficiency of the luminescent material. Preferably, the coating 510 may withstand temperature and pressure of an autoclaving process, such that the coating may be applied prior to completion of a lamination process for laminated glazings. In further embodiments, the coating may be applied after lamination or to a single glass substrate, as the coating 510 may be provided on or in laminated or non-laminated glazings. A coating having luminescent material may be applied to the glazing by any suitable means, including spin, flow or spray applications known in the art. The coating may then be fired or cured. In a certain embodiment, the coating may be cured based on a sol-gel process. In some embodiments where the glazing having a luminescent coating is laminated, the coating may be cured during an autoclaving process. In certain embodiments, the coating base may be clear or colored.

Figure 2:
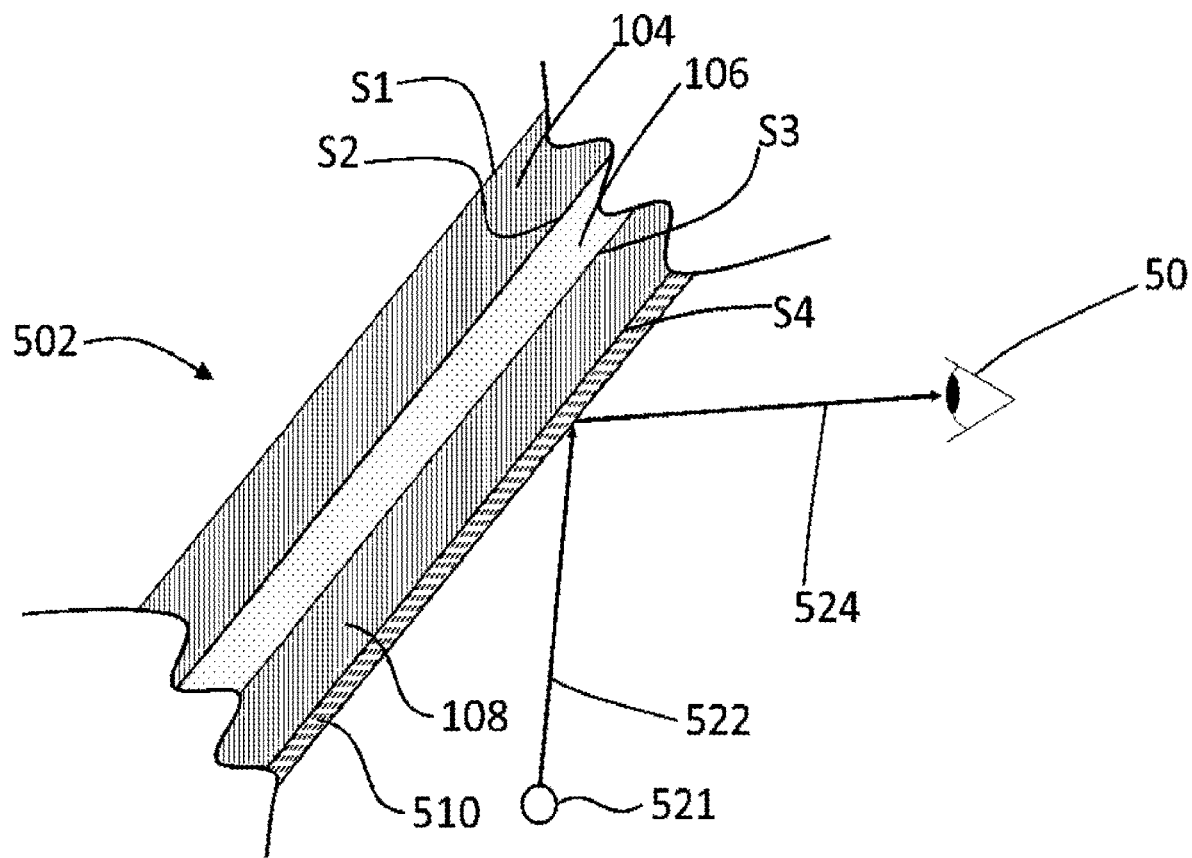
FIG. 2 illustrates a glazing having a luminescent coating, according to an exemplary aspect of the present disclosure.

According to some embodiments, the laminated glazing 502 may be used with a projector 521 serving as a light source to provide a HUD system or other projected displays, as shown in FIG. 2. The projector 521 may preferably direct light 522 in a wavelength or wavelengths to excite the luminescent coating 510 which may illuminate. The projected image 522 may relate directly to the image 524 created at the coating 510 such that the projection resolution may be the same or substantially the same as the image resolution. Preferably, the light 522 projected onto the glazing is less than or equal to 380 nm, more preferably less than or equal to 350 nm, and even more preferably less than or equal to 300 nm. It may be preferable that the emitted light 522 is not visible prior to reaching the luminescent coating 510 as described herein. It may be preferable in some embodiments that the projector 521 emits more than one light wavelength. In further embodiments, more than one projector may be used to project an image, and the projectors may have the same or different light wavelengths emitted therefrom. In certain embodiments, the image formed is a real image on the glazing, such that the image seen by an observer, including a driver or exterior pedestrian, appears at the glazing.

Luminescent coatings 510 may be used for non-HUD projections as well. The luminescent coating 510 may, for example, be used on an automotive glazing to provide information to a vehicle passenger or an observer from outside the vehicle. The coating 510 may thus be on any suitable glazing, such as a windshield, a side window, rear window, partition, or sunroof.

In some embodiments, the luminescent coating 510 may be applied to a laminated or non-laminated glazing. Where the coating 510 is applied to the laminated glazing 502, it may be preferable that the coating 510 is provided on S3 or S4, more preferably on S4. The coating 510 may preferably be provided on a surface of the interior glass substrate 108, such that the luminescent coating 510 may be between the projector and a polymer interlayer material 106, which may include UV absorbers. The UV absorbers may interfere with UV wavelength light 522 reaching and exciting a luminescent coating 510. Further, the illuminated image 524 produced may be clearer where the light 524 travels less through the glazing 502. Light may lose intensity where it travels through a glass substrate 108 before reaching a driver. Where the luminescent material is provided in a coating, rather than a polymer interlayer, the layer of luminescent material may be thinner, as a coating is less thick than a polymer interlayer, which may create a sharper image. In a polymer interlayer, the luminescent materials may be dispersed throughout the interlayer, increasing the depth of the luminescence when excited. Where the luminescent coating 510 is on a non-laminated glazing, the coating 510 may preferably be on S2. Further, the luminescent coating 510 may provide a broad angle of view due to angular light dispersion from the coating 510.

Figure 3:
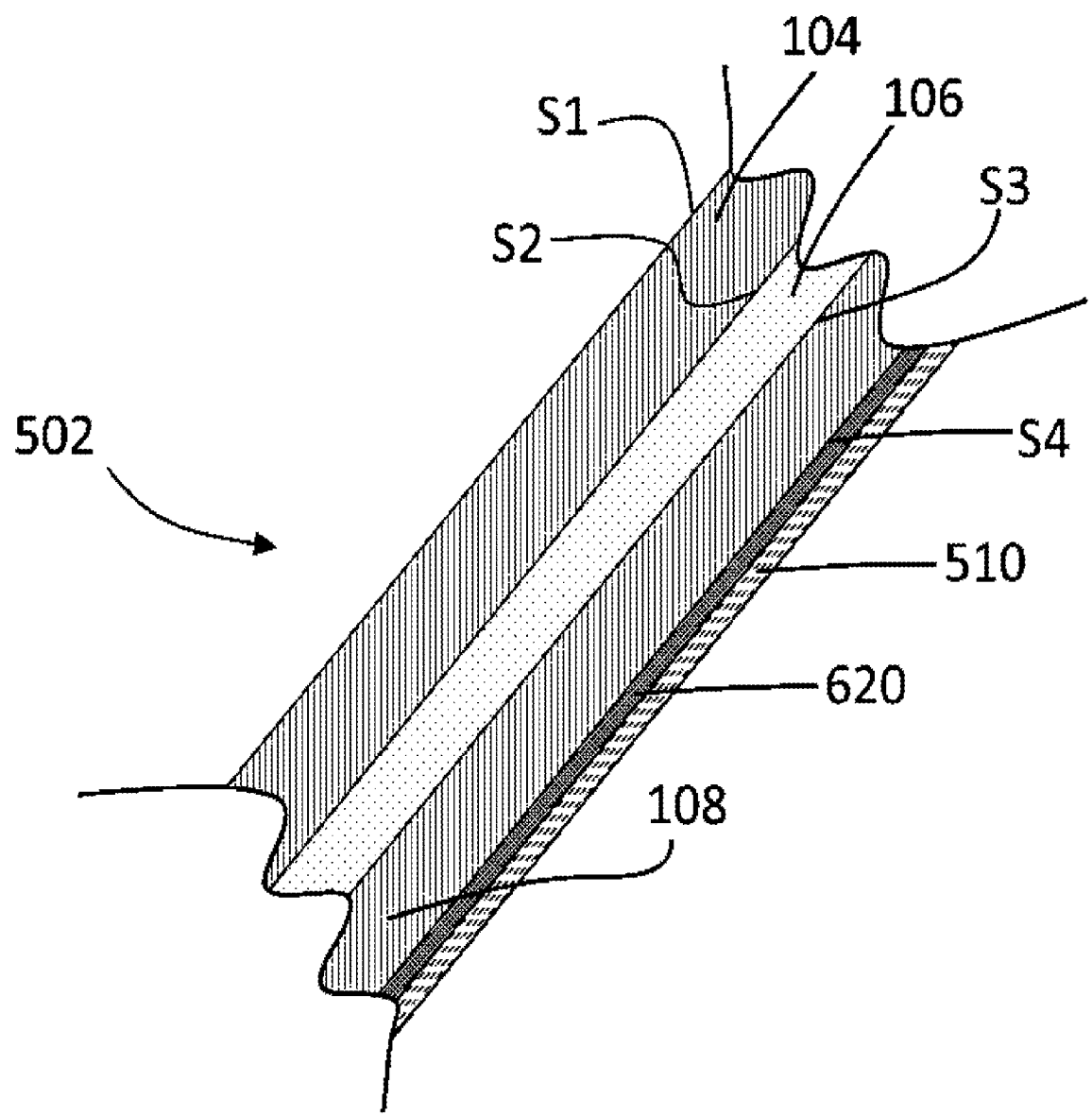
FIG. 3 illustrates a glazing having a luminescent coating, according to another exemplary aspect of the present disclosure.

In certain embodiments, as shown in FIG. 3, a UV absorbing coating 620 may be provided under the luminescent coating 510, such that the UV absorbing coating 620 is between the luminescent coating 510 and the glass substrate 108. The UV absorbing coating may contain, without limitations, triazine-base, benzophenone-based, benzotriazole-based absorption materials and/or combinations thereof. Light projected towards the coated glazing may be in a UV wavelength range to excite the luminescent coating 510. The UV absorbing coating 620 may reduce the UV light that may be reflected into a vehicle from the glazing as the UV light is absorbed by the UV absorbing coating 620 prior to reaching a reflective glass surface S4. The UV absorbing coating 620 may be any suitable coating, including silicon dioxide-based coatings. In some embodiments, the luminescent coating 510 may have further functional properties, including IRR, IRA, and/or UV absorbing capabilities. Further, in a non-laminated glazing without a UV absorbing interlayer, the UV absorbing coating 620 may reduce UV light which may reach a glazing exterior through the glazing. In another embodiment, the glazing may include an interlayer having a UV absorbing function for particularly absorbing sunlight, thereby reducing occurrences of excitation due to radiation of the sunlight.

A glazing having a luminescent coating 510, as disclosed herein, may further, in some embodiments, include a switchable film, such as a polymer dispersed liquid crystal (PDLC), polymer network liquid crystal (PNLC), or suspended particle device (SPD). Liquid crystal materials may include liquid crystals droplets in a polymer matrix. In an OFF state, without any electrical current applied thereto, the liquid crystal droplets may be in a random arrangement and provide an opaque, milky appearance. When an electrical current is applied to the switchable liquid crystal layer, the liquid crystals may align in a nematic orientation in the direction of the electric field. In such an ON state, the parallel orientation of the liquid crystals allows light to pass through and the liquid crystal layer becomes transparent. An SPD layer may include particles suspended in a fluid which provide a darkened color in an OFF state. Under electrical current in an ON state, the SPD layer may be transparent or more transparent than in an OFF state as the particles align, allowing light to pass through the film. The amount of light passing through the film may depend on the electric voltage applied thereto, as a higher voltage may provide a more transparent switchable layer. A "reverse" alignment is also possible, where the switchable material is transparent in an OFF state and opaque or darkened under electrical current in an ON state.

In a darkened (OFF) state, a switchable film may provide a darkened background behind the luminescent coating 510, which may improve visibility of a display therefrom. A switchable film may be preferable such that the glazing may be selectively transparent or opaque. A projection on a luminescent coating 510 on the glazing may be visible whether the switchable film is in an OFF or ON state. However, the illuminated coating 510 may be brighter against a darkened background, i.e., where the switchable film is OFF.

Figure 5:
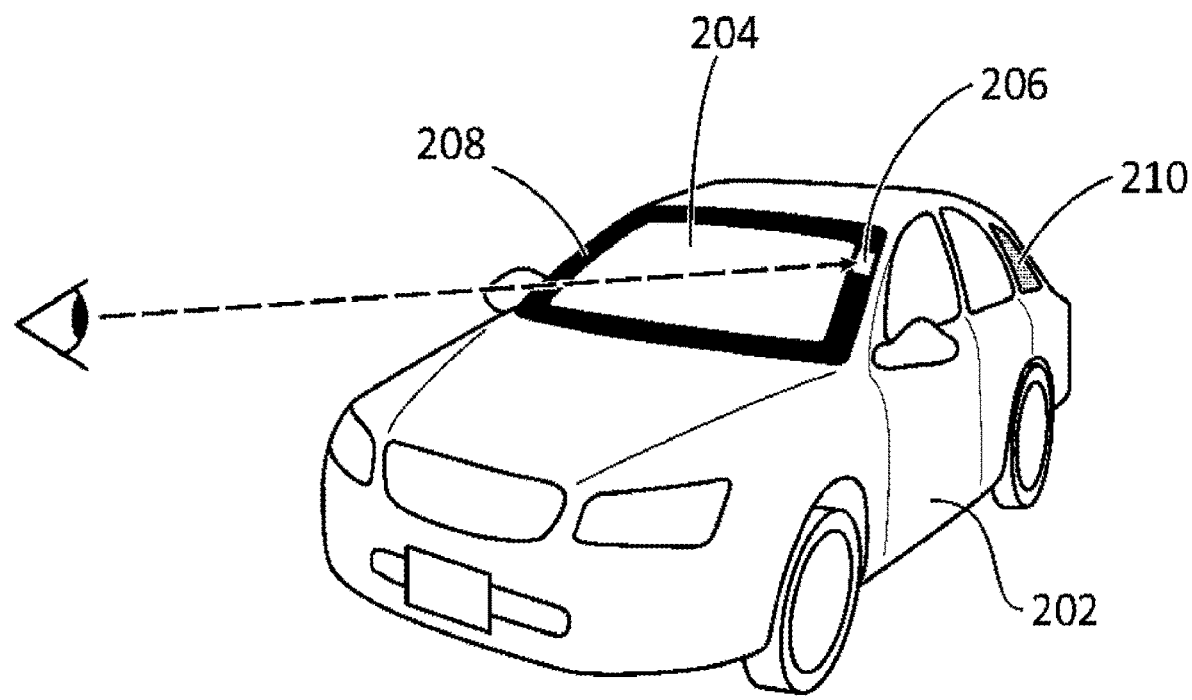
FIG. 5 illustrates a glazing having a luminescent coating provided at a windshield of a vehicle, according to an exemplary aspect of the present disclosure.

FIG. 5 illustrates an embodiment of a glazing according to the disclosure herein installed to a vehicle 202. The vehicle 202 may be a car having a large windshield 204 on a front side of a vehicle interior. The large windshield 204 may include a black print layer 208 formed in a frame like shape on a periphery area of the windshield 204. The black print layer 208 may be made of a black ceramic enamel, typically printed on a glass surface and then fired to harden the print. The black print layer 208 may include an opening 206 and a luminescent coating (not shown) behind the opening 206. In some embodiments, the opening 206 may be in an upper portion of the windshield 204 and may be positioned towards a corner of the windshield 204. With this structure, the vehicle 202 may be capable of emitting light from the luminescent coating through the opening 206 formed in the black print layer 208. The opening 206 may be located at a higher position than the head lamp of the vehicle and may be recognizable by pedestrians as well as drivers and passengers in another vehicle when illuminated. Where a vehicle 202 is in an autonomous operation mode, according to some embodiments, a controller of the vehicle may turn on the light source to excite the portion of the luminescent coating, thereby making the portion of the opening 206 bright to indicate the autonomous operation mode to people outside the vehicle 202. A glazing print may include more than one opening. Each opening may have the same or different emitting colors to be used as signals. The opening 206 may be in any suitable location to provide information to a receiving party, including in a windshield, sunroof, side windows, and a rear window. Where an illumination is meant for pedestrians, it may be preferable to arrange to the illumination on the windshield or other portions such as side windows.

Figure 13:
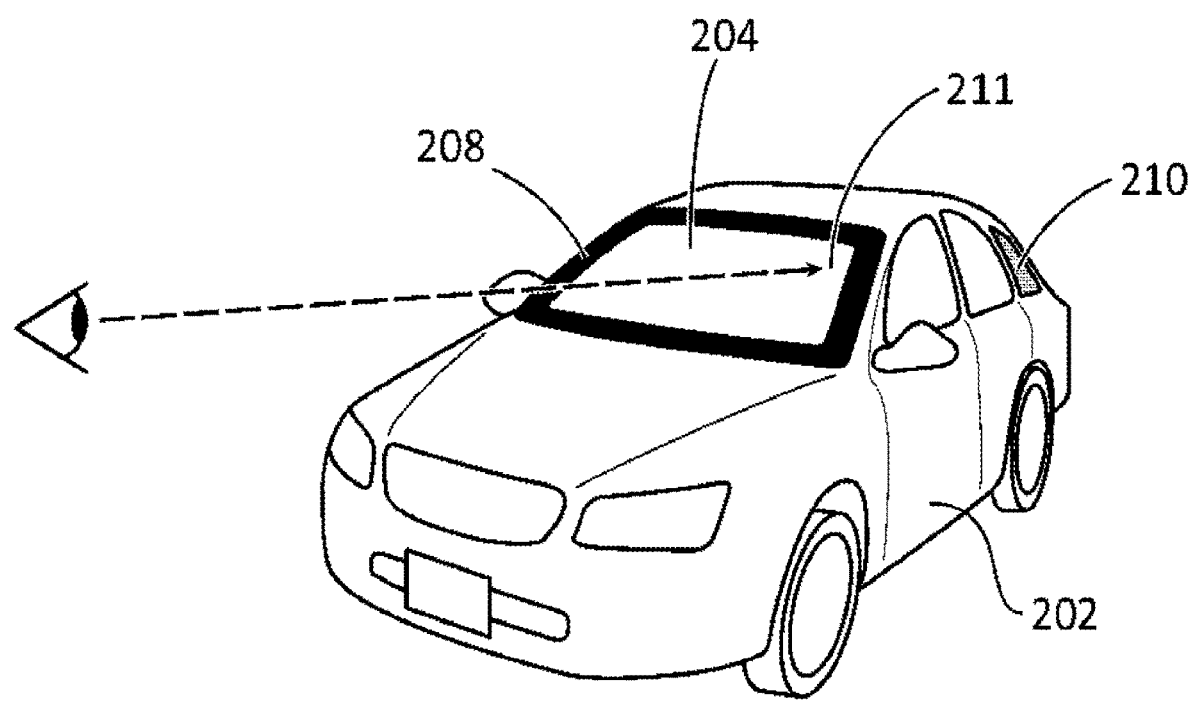
FIG. 13 illustrates a glazing having a luminescent coating provided at a windshield of a vehicle, according to further an exemplary aspect of the present disclosure.

FIG. 13 shows another embodiment of a glazing arranged as a windshield 204 of a vehicle 202. The windshield 204 may include a black print layer 208 formed in a periphery area of the windshield. A coating with a luminescent material may be formed across the entire area of the windshield 204 within the black print. When a light is radiated to a portion 211 inside the black print layer 208, the portion may become bright to emit light outward and provide an illumination. Such light can be seen easily by pedestrians.

The vehicle 202 may including an illumination area at a quarter window 210. The quarter window 210 may include a luminescent coating covering the entire surface of the quarter glass. Where the light source (not shown) is turned on, the entire area of the quarter window 210 may be brightened, or illuminated, to be seen by people outside the vehicle. The light may be projected to the quarter window 210 in a shape of a desired image to be formed on the quarter window 210. Such a glass component may be placed in various sizes and locations on the surface of vehicles, as modified examples of this disclosure.

Figure 6:
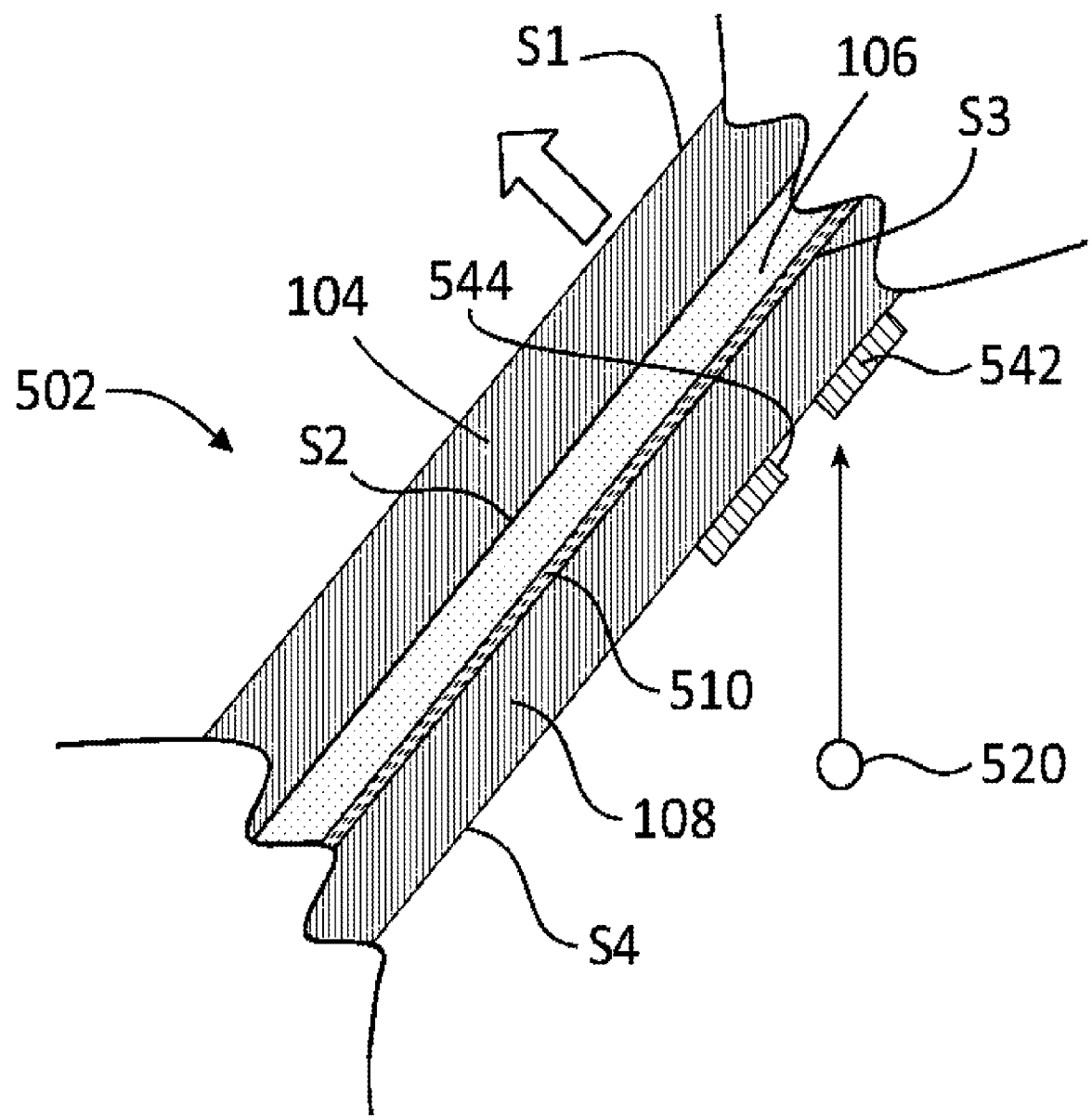
FIG. 6 illustrates a glazing having a luminescent coating with a structure of a black print layer according to an exemplary aspect of the present disclosure.

FIG. 6 shows a cross section of a laminated glazing structure according to an embodiment of the present disclosure. The glazing 502 may have first and second glass substrates 104, 108 and a polymer interlayer 106 provided between the first and second glass substrates 104, 108. A luminescent coating 510 may be provided on the surface S3 between the second glass substrate 108 and the polymer interlayer 106. A black print layer 542 may be formed on the surface S4 of the second glass substrate 108. Such a black print layer 542 may be arranged on a circumferential area surrounding a vehicle windshield, at the glazing periphery, and may include an opening to allow light ray passing through. In some embodiments, there may be more than one opening in the black print layer 542. The openings may have the same or different shapes and sizes. Where multiple openings in the black print layer 542 align with a luminescent coating 510, the openings may be used to provide different signals to an observer. With this glazing structure, a light source 520 may be provided near the laminated glazing as to illuminate in areas including the black print layer 542. Some light may be blocked by the black print layer 542, whereas other light may pass through the second glass substrate 108 and reach the luminescent coating 510 formed between the second glass substrate 108 and the polymer interlayer 106. The light may excite the luminescent material in the luminescent coating 510 so as to emit light toward the surface S1 of the first glass substrate 104 or, namely, the exterior of the glazing.

Figure 7:
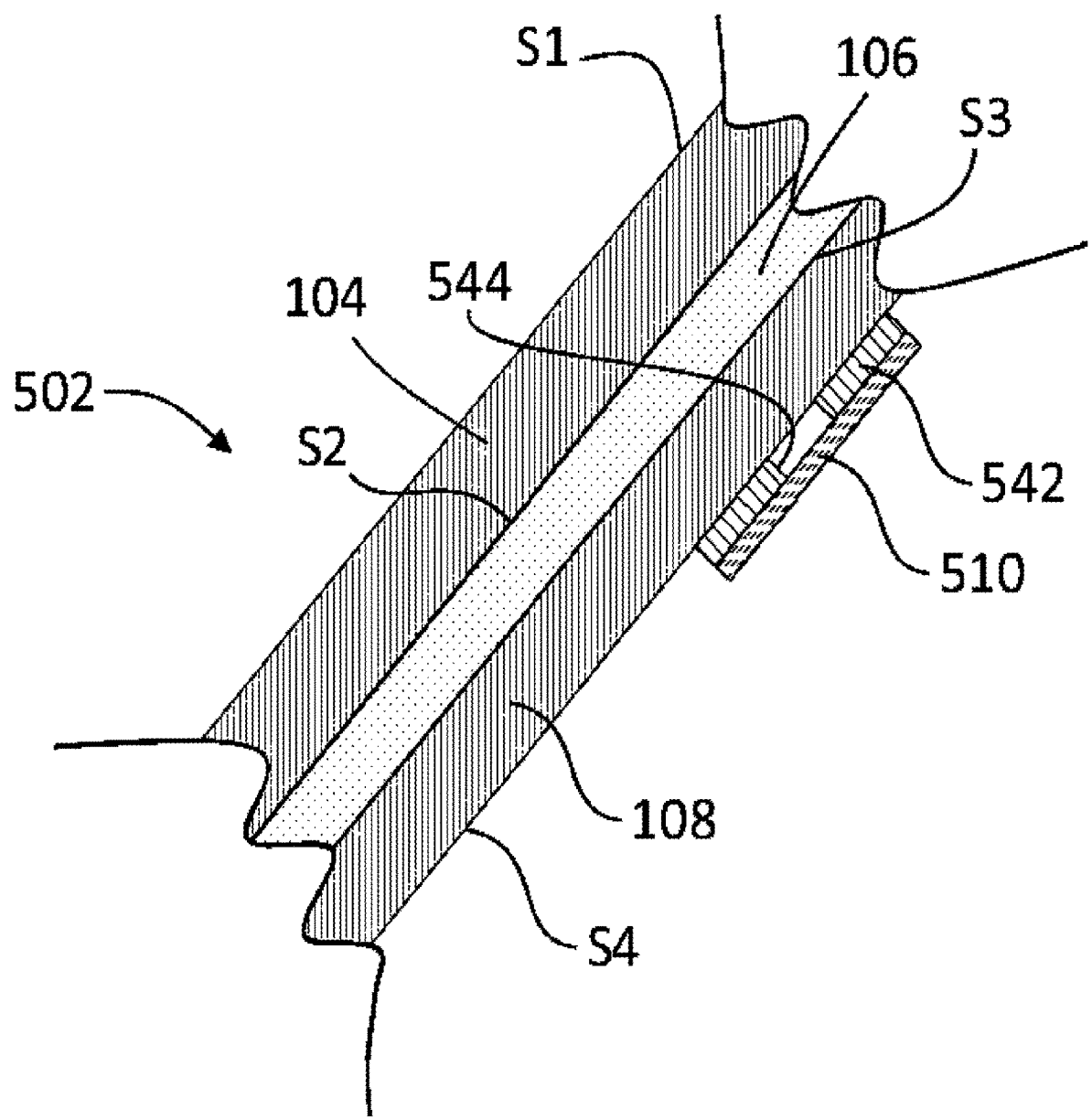
FIG. 7 illustrates a glazing having a luminescent coating with a structure of a black print layer according to another exemplary aspect of the present disclosure.

FIG. 7 shows another structure with a black print layer 542. According to certain embodiments herein, the black printer layer 542 may be provided between the surface S4 of the second glass substrate 108 and a luminescent coating 510. The luminescent coating 510 may be coated locally over the area of the black print layer 542 and openings 544 within the black print layer 542. The luminescent coating 510 may emit light upon reception of light from a light source (not shown), and some of the light may pass through the opening 544 in the black print layer 542 and further through the first and second glass substrates 104, 108 to the exterior of the glazing. The emission pattern of the light may correspond to a pattern of an opening 544 in the black print layer 542 or the light displayed may correlate to a shape of projected light within the opening 544. In some embodiments, an opening 544 in a black printer layer 542 may include a printed word or image to convey a message when illuminated by a luminescent coating 510.

Figure 8:
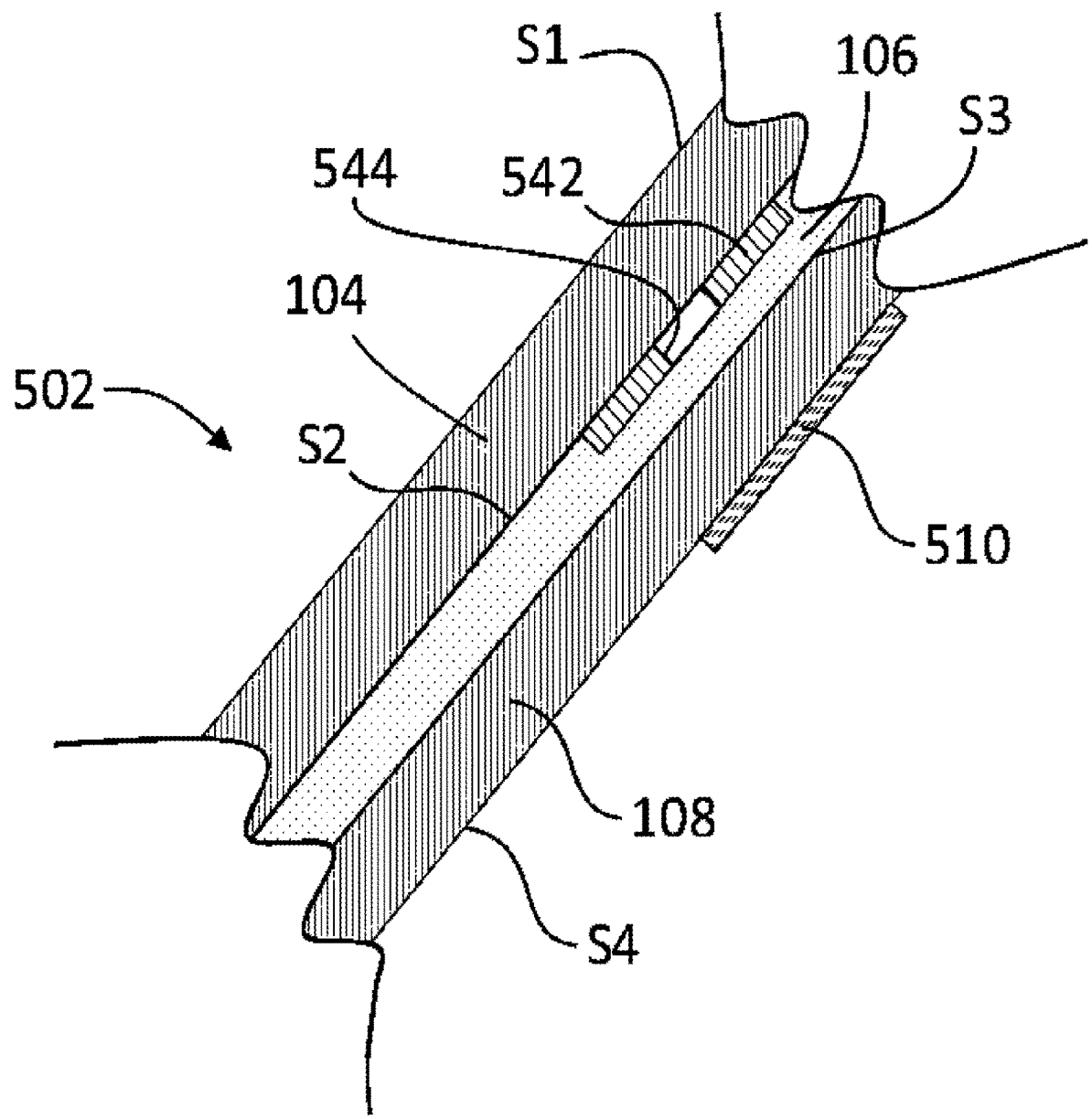
FIG. 8 illustrates a glazing having a luminescent coating with a black print layer, according to yet another exemplary aspect of the present disclosure.

A structure shown in FIG. 8 is a modified embodiment of the structure shown in FIG. 7. The black print layer 542 with the opening 544 may be formed between the first glass substrate 104 and the polymer interlayer 106. The luminescent coating 510 may be provided over an area on the surface S4 of the second glass substrate 108, in an area to align with the black print layer 542 and its opening 544. Where the light source (not shown) is turned on, light is transmitted to the luminescent coating 510 and excites the luminescent material in the coating to generate illuminated light from the luminescent coating 510. The excited light may be visible to the exterior, passing though the opening 544 formed in the black print layer 542.

Figure 9:
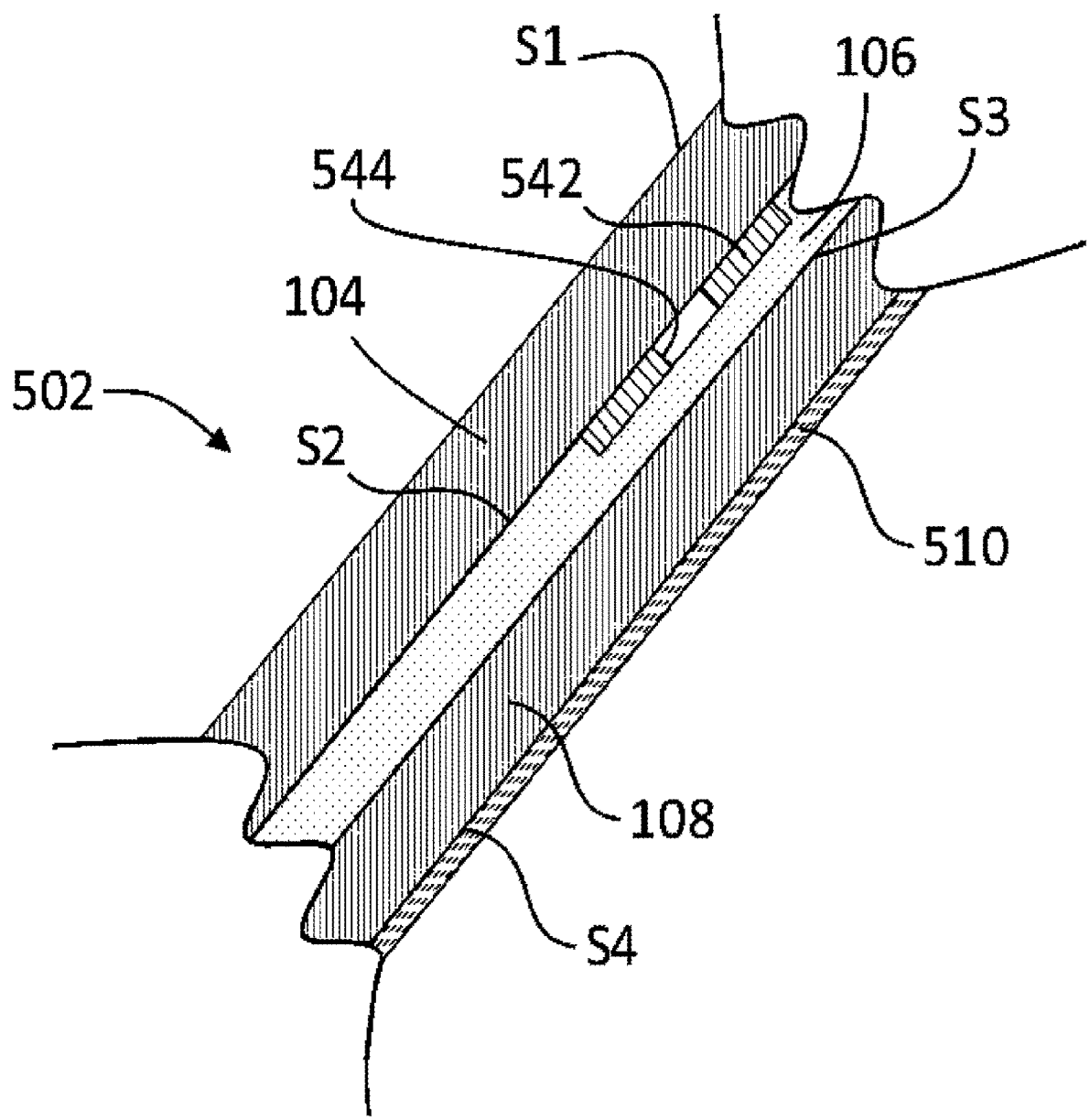
FIG. 9 illustrates a glazing having a luminescent coating with a black print layer, according to further another exemplary aspect of the present disclosure.

A structure shown in FIG. 9 is a further modified embodiment of the structure shown in FIG. 8. The structure shown in FIG. 9 shows the luminescent coating 510 may be formed over the entire surface of the second glass substrate 108.

Figure 10:
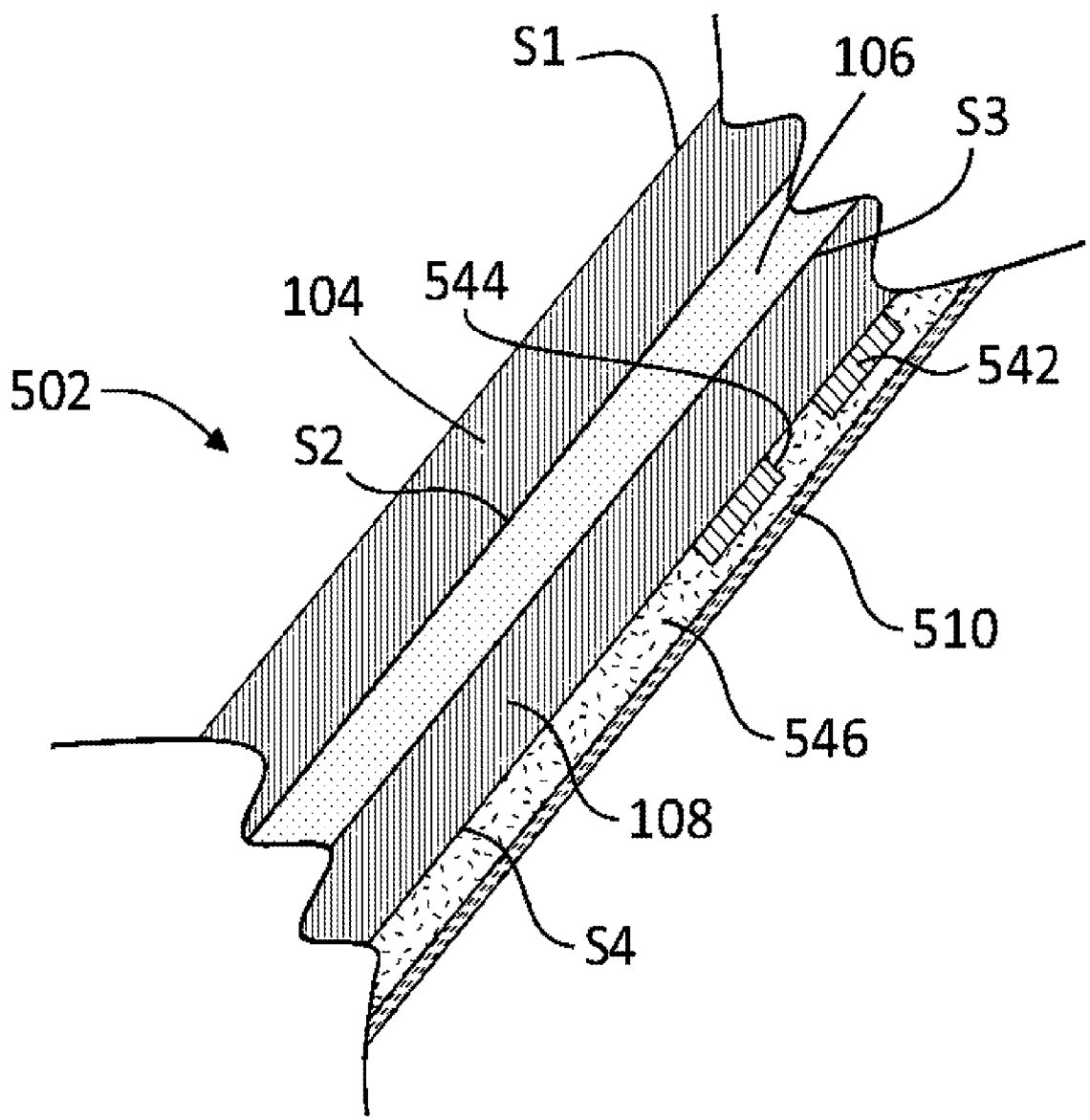
FIG. 10 illustrates a glazing having a luminescent coating with an ultraviolet absorbing layer, according to further still another exemplary aspect of the present disclosure.

FIG. 10 shows a cross section of another laminated glazing structure according to certain embodiments herein. The glazing 502 for vehicle may include first and second glass substrates 104, 108 and a polymer interlayer 106 provided between the first and second glass substrates 104, 108. A black print layer 542 with an opening 544 may be formed on the surface S4 of the second glass substrate 108. The black print layer 542 may be covered with a UV absorbing layer 546 formed of an ultraviolet absorbing polymer or polymers for absorbing light scattered from the light source. The UV absorbing layer 546 may also provide an even surface for contacting the luminescent coating 510 for easy and accurate coating application. The UV absorbing layer 546 may further absorb the UV light reflected on the surface S4 and reduce the light which may otherwise be directed to the vehicle driver. When the light source (not shown) is turned on, the light may radiate to the luminescent coating 510. The luminescent coating 510 may then be excited and emit light. Some light may pass through the black print layer 542 and emit to the exterior of the glazing. The black print layer 542 may have edges around an opening. The UV absorbing layer 546 may be formed over the black print layer 542 and provide an even surface for the luminescent coating 510. An even luminescent coating 510 may reduce the unwanted scattering of light emitted from the luminescent coating 510.

Figure 11:
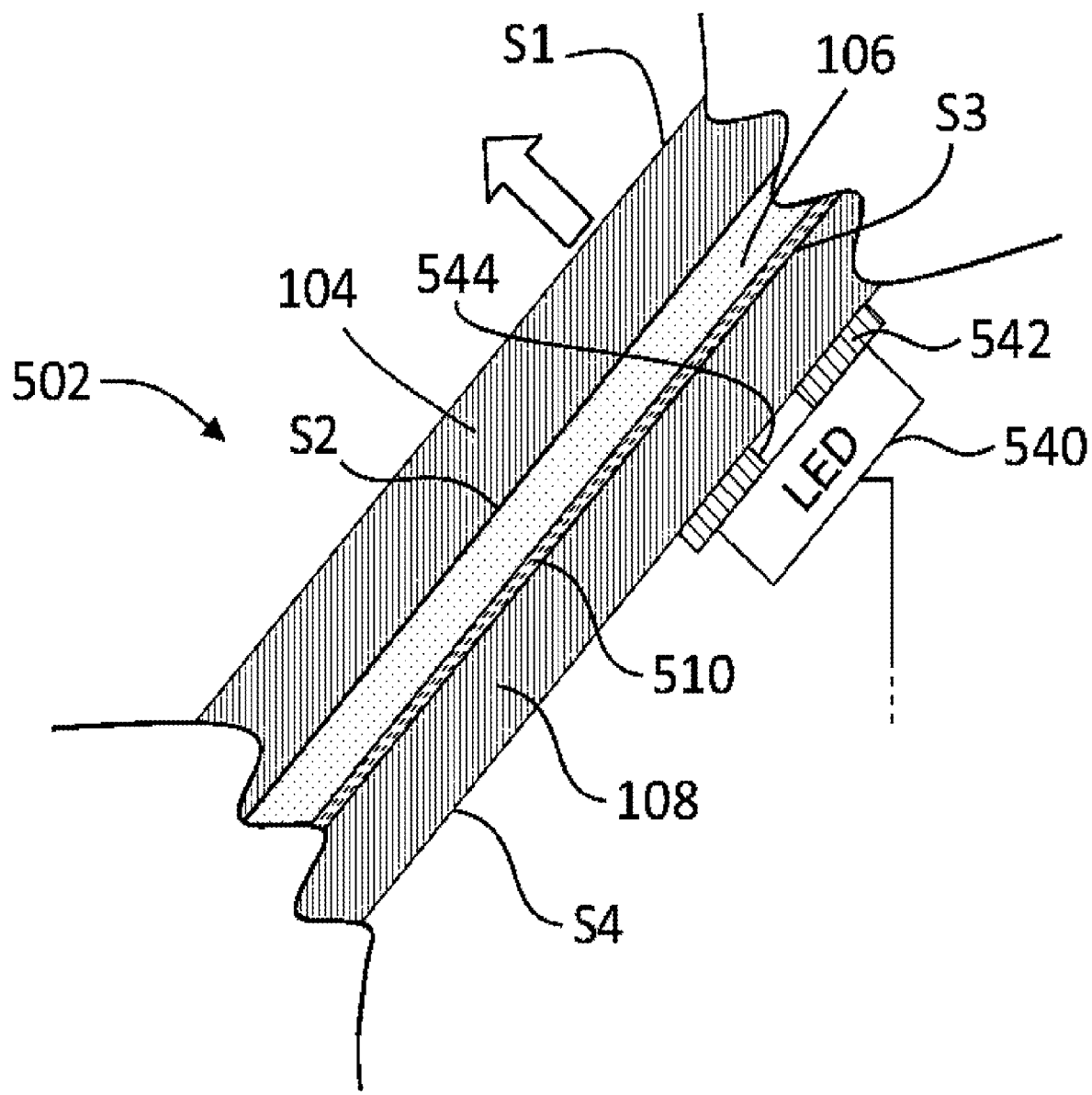
FIG. 11 illustrates a glazing having a luminescent coating with a structure of a black print layer and an LED according to further yet another exemplary aspect of the present disclosure.

FIG. 11 shows a cross section of a laminated glazing structure with a contact type LED light source 540, according to certain embodiments herein. The glazing 502 may have first and second glass substrates 104, 108 and a polymer interlayer 106 provided between the first and second glass substrates 104, 108. A luminescent coating 510 may be provided on the surface S3 between the second glass substrate 108 and the polymer interlayer 106. An LED 540 may be mounted on the surface S4 of the second glass substrate over a black print layer 542. The LED 540 may emit one or more any suitable wavelengths including in an ultraviolet region. The black print layer 542 may have an opening 544 which light emitted from the LED 540 may pass through. Where the black print layer 542 is positioned between the luminescent coating 510 and the LED 540, the LED light may only reach the luminescent coating 510 in an area aligned with the opening 544, and the luminescent coating 510 may be excited only in such an area aligned with the opening 544.

Figure 12:
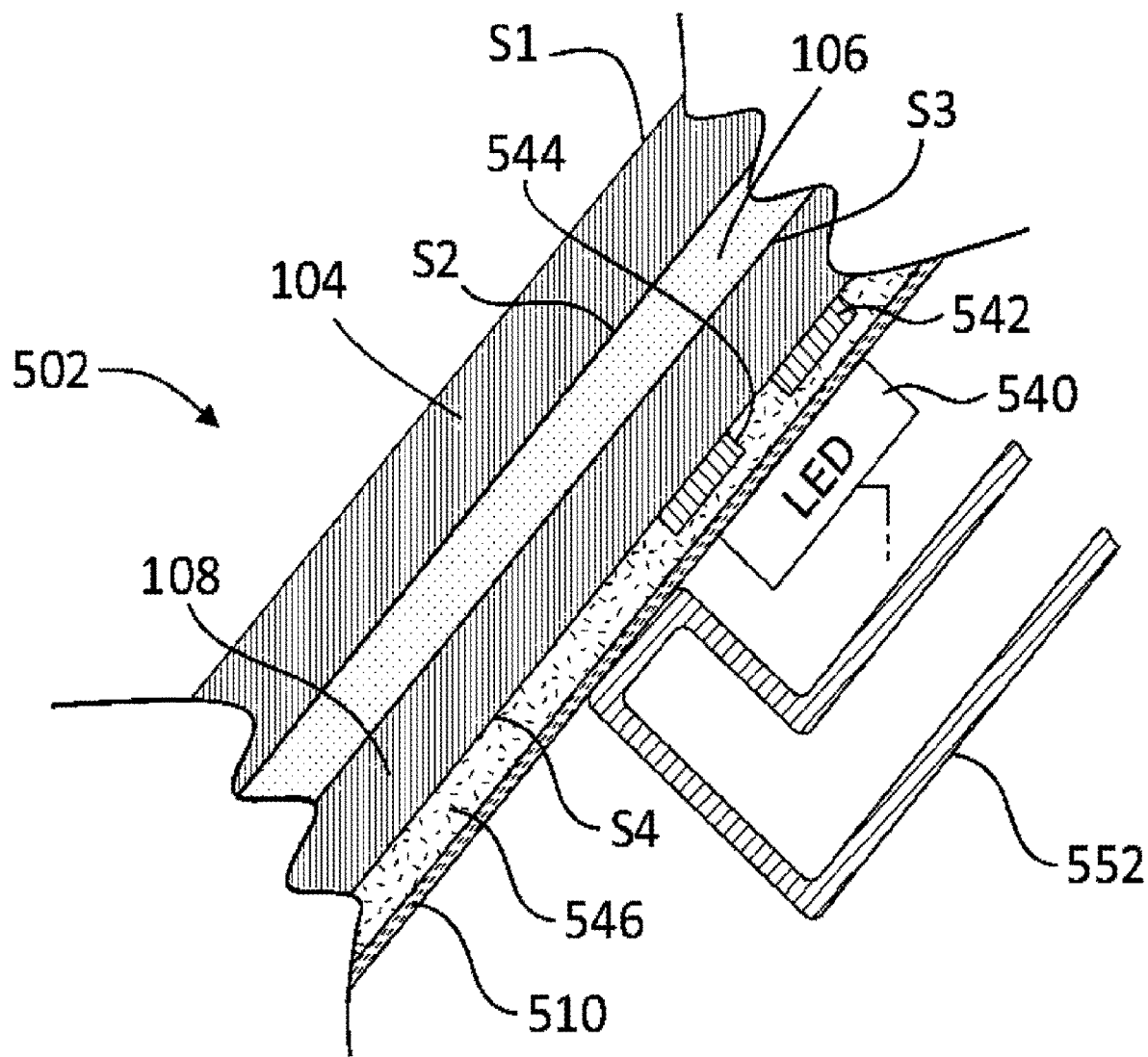
FIG. 12 illustrates a glazing having a luminescent coating with a trim component, according to an exemplary aspect of the present disclosure.

FIG. 12 shows another embodiment of a vehicle glazing. The glazing 502 may have the same structure as shown in FIG. 10. An LED 540 may be arranged on a surface of the luminescent coating 510 at a position directly behind the black print layer 542 when seen from the exterior of the vehicle. The LED 540 may serve as a light source and may be arranged within a space formed inside a trim component 552. The trim component 552 may be part of a vehicle to seal parts and wiring around a glazing and may be formed along a glazing edge and sections of a pillar and a dashboard without fastening member. The trim component 552 may further prevent light emitted from the LED 540 from scattering to the interior of the vehicle.

Figure 14:
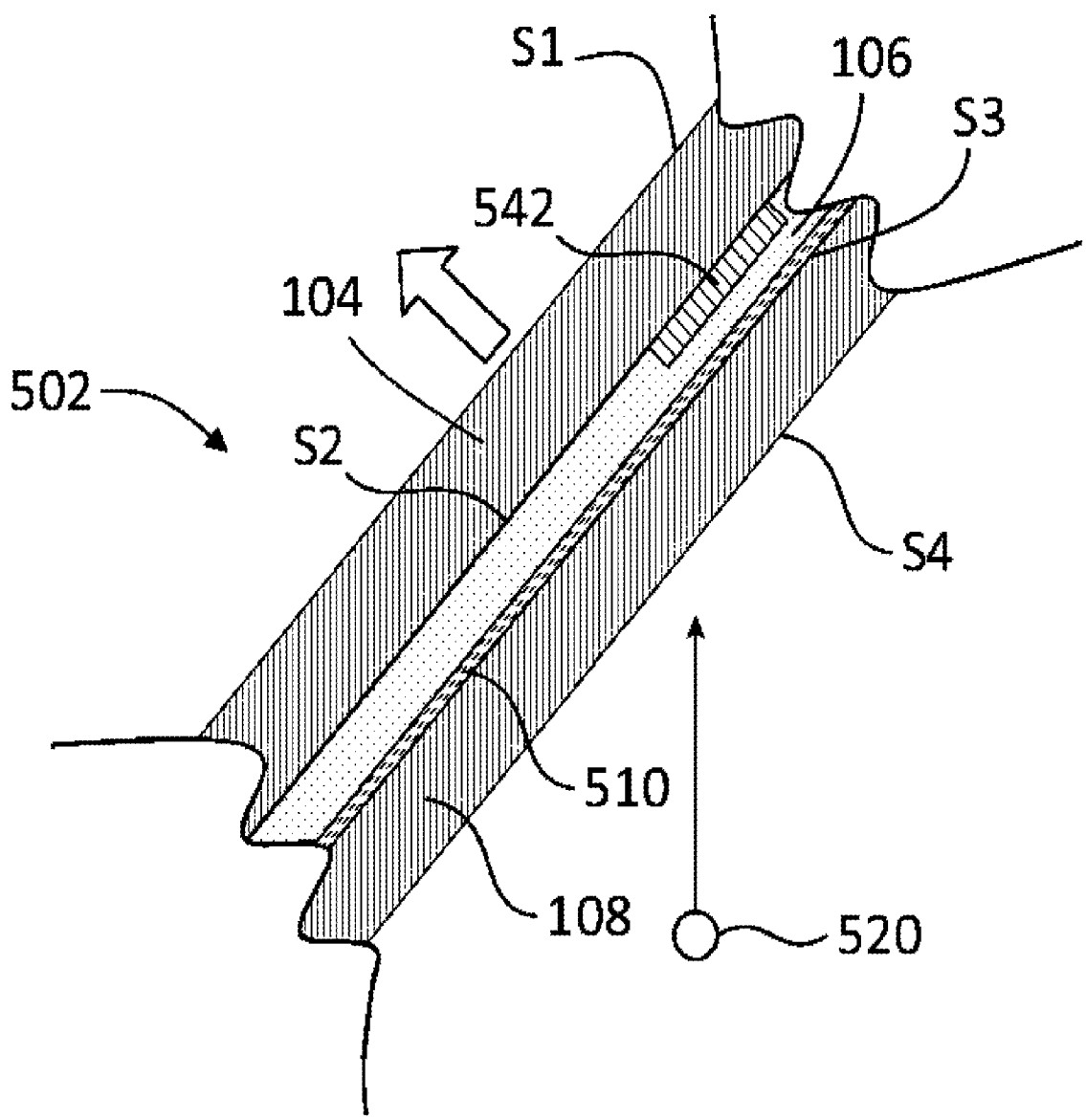
FIG. 14 illustrates a glazing having a luminescent coating according to an exemplary aspect of the present disclosure.

In some embodiments, as shown in FIG. 14, the black print layer 542 may be formed on the surface S2 of the first glass substrate 104, where the luminescent coating 510 may be provided between the polymer interlayer 106 and the surface S3 of the second glass substrate 108. The polymer interlayer 106 may contain materials having UV absorbing property, such as triazine-base, benzophenone-based, benzotriazole-based absorption materials and/or combinations thereof, without limitation. Light emitted from the light source 520 may be directed toward a portion 211 of the luminescent coating 510 within the black print, and light may be generated to be emitted toward the exterior and/or interior of the glazing from the luminescent coating 510.

Figure 15:
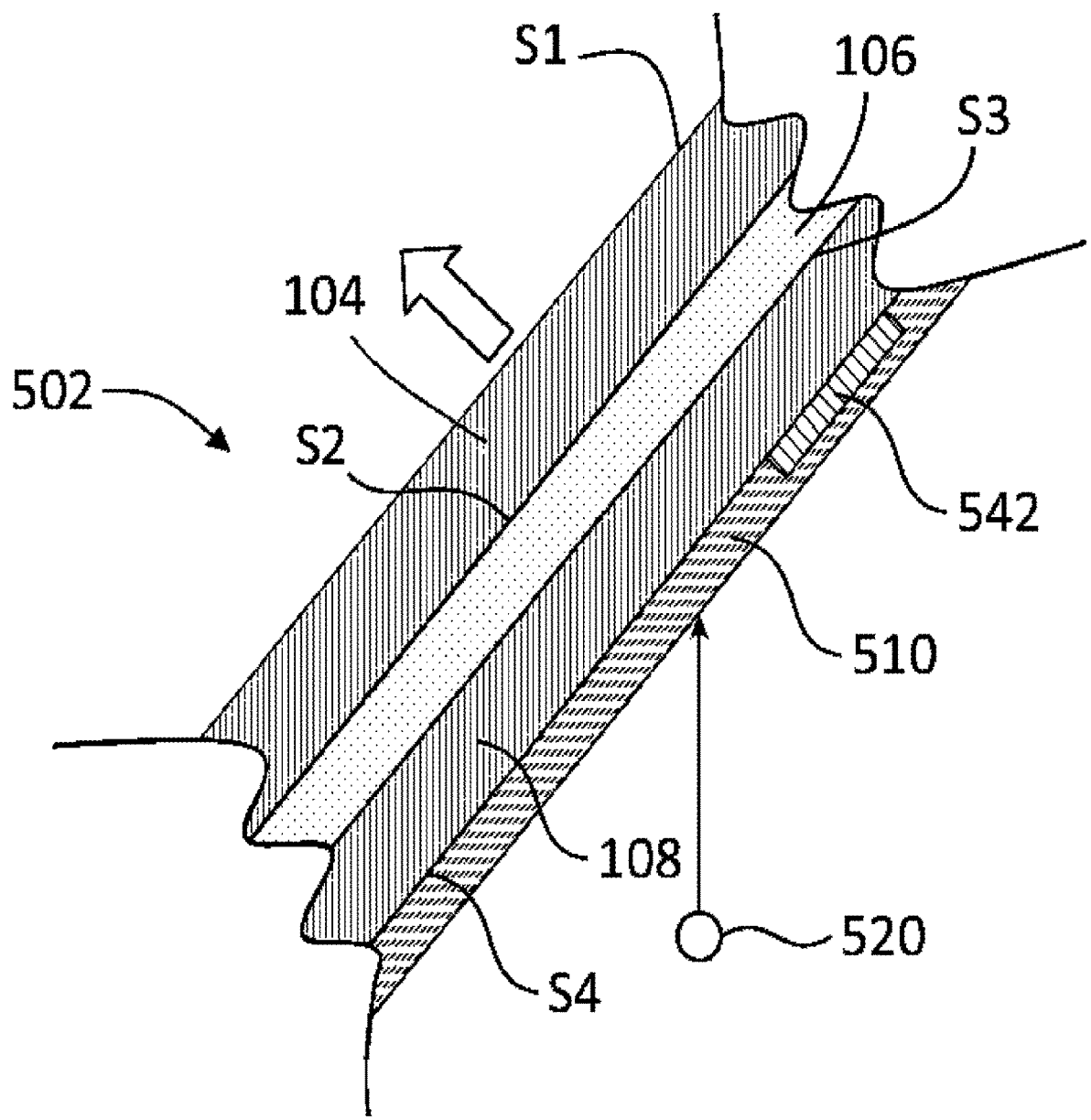
FIG. 15 illustrates a glazing having a luminescent coating at a black print layer according to another exemplary aspect of the present disclosure.

In some further embodiments, as shown in FIG. 15, both of the black print layer 542 and the luminescent coating 510 may be formed on the surface S4 of the second glass substrate 108. In this structure, the black print layer 542 may be covered with the luminescent coating 510. The surface of the luminescent coating 510 may have a relatively flat surface by spin or spray coating or other suitable methods, thereby maintaining excellent optics for reducing the scattering of light passing therethrough. The light emitted from the light source 520 may radiate to the luminescent coating 510, which may be excited to emit light toward the interior and/or exterior of the glazing.

Figure 16:
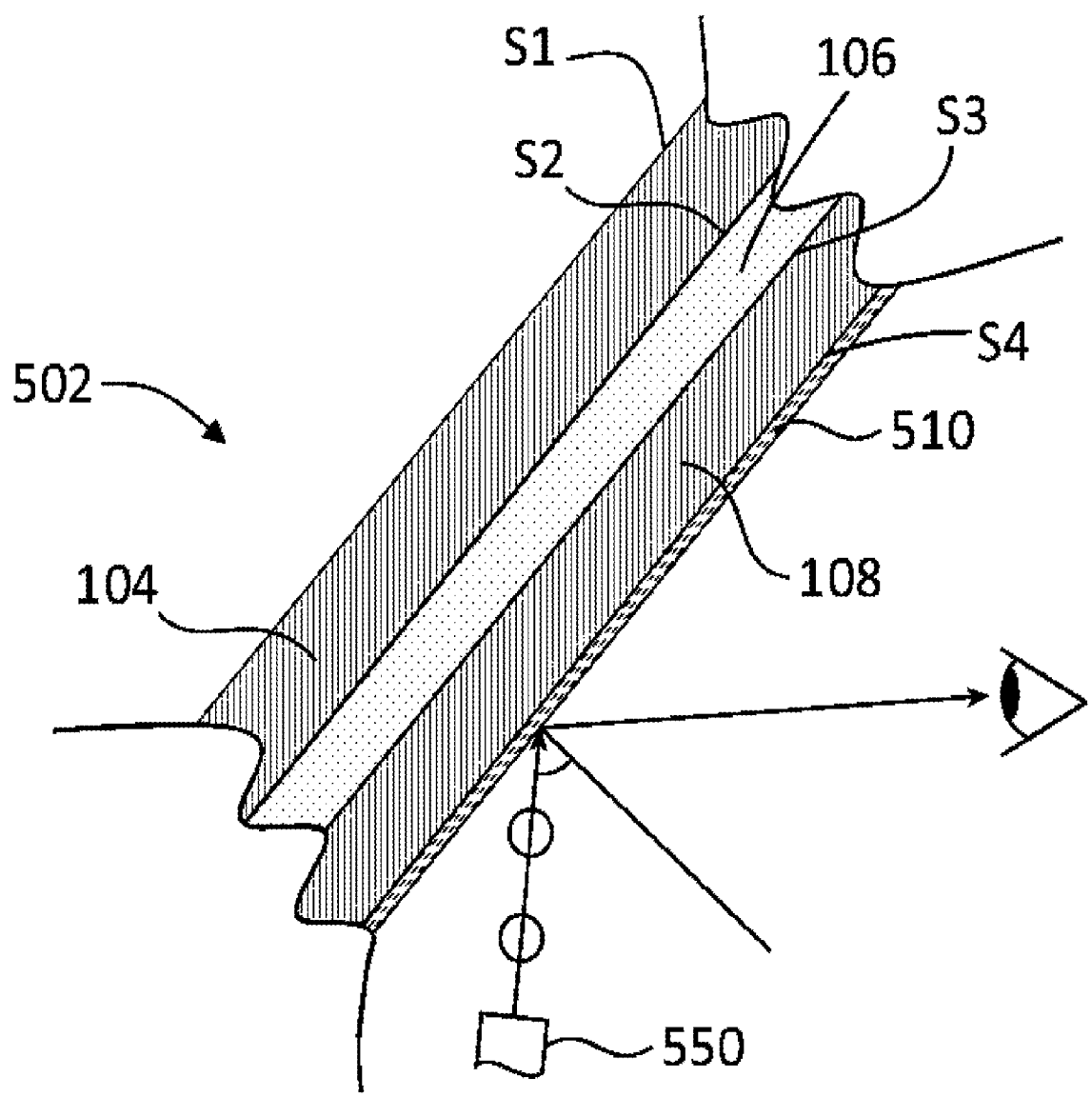
FIG. 16 illustrates a glazing having a luminescent coating with polarized light ray, according to yet another exemplary aspect of the present disclosure.

FIG. 16 shows a glazing utilizing a polarized light according to further embodiments. Where the luminescent coating 510 made of $SiO_2$ is formed on the surface S4, the Brewster angle may be approximately 56 degrees where the light reaches the surface of the coating. If the luminescent coating 510 is formed on the surface S3 between the interlayer polymer 106 and the second glass substrate 108, the Brewster angle may be approximately 57 degrees at the surface S4 of the second glass substrate. Where the excitation light is set to P-polarized light, reflection of the excitation light may be suppressed at boundaries, such as a boundary between air and glass where the luminescent layer is placed at the surface S3 or a boundary between air and luminescent layer where the luminescent layer is placed at the surface S4, in a broader range in comparison to non-P-polarized light excitation. Vehicle drivers may therefore be able to observe light excited at the luminescent layer without viewing excitation light reflected at the boundaries. Moreover, where the excitation light of the P-polarized light enters the glazing at the Brewster angle, the glazing may eliminate reflection of excitation light at the boundary, so that vehicle drivers may be protected from exposed to the UV light which may otherwise be reflected from the glazing toward a vehicle interior.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A glazing, comprising:
   a first glass substrate having first and second surfaces;
   a second glass substrate having third and fourth surfaces;
   a polymer interlayer laminated between the first and second substrates; and
   a first coating including a first luminescent material and being applied on the fourth surface of the second glass substrate,
   wherein the first coating includes a base material in which the first luminescent material is dispersed, and the base material comprises silicon dioxide,
   wherein the interlayer includes ultraviolet light absorbing materials, and
   wherein the first luminescent material is excited with light of a wavelength of 380 nm or less.

2. The glazing according to claim 1, wherein the glazing is a windshield.

3. The glazing according to claim 1, further comprising a second luminescent material, wherein the first luminescent material is excitable at a first wavelength and the second luminescent material is excitable at a second wavelength, wherein the first wavelength is different from the second wavelength, and
   wherein the first and second luminescent materials are in the first coating.

4. The glazing according to claim 1, further comprising a second coating comprising a second luminescent material.

5. The glazing according to claim 4, wherein the first coating and the second coating are on the same glass surface.

6. The glazing according to claim 5, wherein the first coating and the second coating do not overlap.

7. The glazing according to claim 1, wherein the first coating further comprises at least one of ultraviolet absorbing materials, infrared reflective materials, and infrared absorbing materials.

8. The glazing according to claim 1, further comprising an undercoating formed between the first coating and the second glass substrate.

9. The glazing according to claim 8, wherein the undercoating is ultraviolet light absorbing and silicon dioxide based.

10. The glazing according to claim 1, further comprising a switchable layer between the first glass substrate and the second glass substrate.

11. The glazing according to claim 1, wherein the glazing is a vehicle glazing, and light emitted from the first coating is directed toward an exterior of the vehicle.

12. The glazing according to claim 11, wherein the light from the first coating provides operational information to the exterior of the vehicle.

13. The glazing according to claim 11, wherein the light from the first coating indicates an autonomous mode to the exterior of the vehicle where the vehicle is an autonomous vehicle.

14. The glazing according to claim 11, wherein the light is emitted through an opening formed in a black print layer.

15. The glazing according to claim 14, wherein the black print layer is covered with an ultraviolet light absorbing layer.

16. The glazing according to claim 1, further comprising:
   a light source which emits excitation light to the first luminescent material.

17. The glazing according to claim 16, wherein the light source is arranged on or closely to the fourth surface of the second substrate.

18. The glazing according to claim 17, wherein the light source is covered by a trim component.

19. The glazing according to claim 16, wherein the glazing is for an autonomous vehicle and the light source is controlled according to operation modes including an autonomous drive mode.

20. A glazing, comprising:
   a glass substrate having first and second surfaces, wherein the first surface is opposite the second surface; and
   a coating on one of the first and second surfaces of the glass substrate, wherein the coating comprises a luminescent material,
   wherein the coating includes a base material in which the luminescent material is dispersed, and the base material comprises silicon dioxide.

* * * * *